United States Patent
DelRocco et al.

(10) Patent No.: US 8,359,641 B2
(45) Date of Patent: Jan. 22, 2013

(54) MULTI-LEVEL SECURE INFORMATION RETRIEVAL SYSTEM

(75) Inventors: Anthony J. DelRocco, Clearwater, FL (US); Daniel Teijido, Tampa, FL (US)

(73) Assignee: Raytheon Company, Waltham, MA (US)

( * ) Notice: Subject to any disclaimer, the term of this patent is extended or adjusted under 35 U.S.C. 154(b) by 637 days.

(21) Appl. No.: 12/329,407

(22) Filed: Dec. 5, 2008

(65) Prior Publication Data
US 2010/0146618 A1 Jun. 10, 2010

(51) Int. Cl.
G06F 7/04 (2006.01)
G06F 9/00 (2006.01)
H04L 29/06 (2006.01)
H04L 9/32 (2006.01)

(52) U.S. Cl. ............... 726/7; 726/12; 726/15; 713/166; 713/172

(58) Field of Classification Search ............... 726/7, 12, 726/15; 713/166, 172
See application file for complete search history.

(56) References Cited

U.S. PATENT DOCUMENTS

| | | | |
|---|---|---|---|
| 6,085,324 A | 7/2000 | Ogram | |
| 6,367,013 B1 | 4/2002 | Bisbee et al. | |
| 7,120,927 B1 | 10/2006 | Beyda et al. | |
| 7,127,741 B2 | 10/2006 | Bandini et al. | |
| 7,131,000 B2 | 10/2006 | Bradee | |
| 7,174,363 B1 | 2/2007 | Goldstein et al. | |
| 7,328,351 B2 | 2/2008 | Yokota et al. | |
| 7,346,923 B2 | 3/2008 | Atkins et al. | |
| 7,444,672 B2 | 10/2008 | Ellmore | |
| 7,451,163 B2 * | 11/2008 | Selman et al. ............... 1/1 | |
| 7,467,399 B2 | 12/2008 | Nadalin et al. | |
| 7,472,413 B1 | 12/2008 | Mowshowitz | |
| 7,505,482 B2 | 3/2009 | Adamczyk et al. | |
| 7,571,473 B1 | 8/2009 | Boydstun et al. | |
| 2002/0169874 A1 | 11/2002 | Batson et al. | |
| 2003/0126558 A1 | 7/2003 | Griffin | |
| 2003/0163733 A1 | 8/2003 | Barriga-Caceres et al. | |

(Continued)

FOREIGN PATENT DOCUMENTS

| | | |
|---|---|---|
| EP | 1 280 316 | 1/2003 |
| EP | 1 635 524 | 3/2006 |

(Continued)

OTHER PUBLICATIONS

Notification of Transmittal of the International Search Report and the Written Opinion of the International Searching Authority, or the Declaration for PCT US2009/063021 (11 pages), Feb. 25, 2010.

(Continued)

*Primary Examiner* — Kambiz Zand
*Assistant Examiner* — Teshome Hailu
(74) *Attorney, Agent, or Firm* — Schwegman Lundberg & Woessner, P.A.

(57) ABSTRACT

According to one embodiment, a multi-level secure information retrieval system includes an enterprise access service tool coupled to one or more client applications and at least one gateway managed by an enterprise. The enterprise access service tool executes services operating in a service oriented architecture. The enterprise access service tool receives requests from the client applications, associates each of the requests with one of a plurality of differing security levels, and transmits the requests to the gateway. The gateway transmits the requested information back to the client applications in which the information is filtered by the gateway according to their associated security levels.

23 Claims, 3 Drawing Sheets

U.S. PATENT DOCUMENTS

| | | | |
|---|---|---|---|
| 2003/0188167 | A1 | 10/2003 | Kurosaki et al. |
| 2004/0111519 | A1 | 6/2004 | Fu et al. |
| 2004/0230831 | A1 | 11/2004 | Spelman et al. |
| 2005/0044197 | A1 | 2/2005 | Lai |
| 2005/0132070 | A1 | 6/2005 | Redlich et al. |
| 2005/0149496 | A1 | 7/2005 | Mukherjee et al. |
| 2005/0198412 | A1* | 9/2005 | Pedersen et al. ............ 710/30 |
| 2007/0245409 | A1 | 10/2007 | Harris et al. |
| 2007/0250921 | A1 | 10/2007 | LiVecchi |
| 2008/0072290 | A1* | 3/2008 | Metzer et al. ............ 726/3 |
| 2008/0126799 | A1 | 5/2008 | Winig |
| 2008/0127297 | A1* | 5/2008 | Morris ............ 726/1 |
| 2009/0254392 | A1* | 10/2009 | Zander ............ 705/7 |
| 2009/0319782 | A1* | 12/2009 | Lee ............ 713/156 |
| 2010/0011007 | A1* | 1/2010 | Bettger et al. ............ 707/10 |
| 2010/0146608 | A1* | 6/2010 | Batie et al. ............ 726/7 |

FOREIGN PATENT DOCUMENTS

| | | |
|---|---|---|
| GB | 2 421 156 | 6/2006 |
| WO | WO 2005/096543 | 10/2005 |

OTHER PUBLICATIONS

Notification of Transmittal of the International Search Report and the Written Opinion of the International Searching Authority, or the Declaration for PCT/US2009/043684, Mar. 5, 2010.
Notification of Transmittal of the International Search Report and the Written Opinion of the International Searching Authority, or the Declaration for PCT/US2009/049485, Dec. 7, 2009.
Notification of Transmittal of the International Search Report and the Written Opinion of the International Searching Authority, or the Declaration for PCT/US2009/047588, Oct. 23, 2009.
Intellectual Property Office, South Wales, NP10 8QQ; Examination Report under section 18(3); re: Application No. GB1100172.4, Apr. 21, 2011.
Intellectual Property Office, South Wales, NP10 8QQ; Examination Report under section 18(3); re: Application No. GB1100172.4; dated Oct. 5, 2011; 3 pages, Oct. 5, 2011.
U.S. Appl. No. 12/496,444 , Dickson et al., *Multi-Level Secure Network*, filed Jul. 1, 2009.
U.S. Appl. No. 12/176,935; Ricardo J. Rodriguez, et al., *Secure E-Mail Messaging System*, filed Jul. 21, 2008.
USPTO Office Action for U.S. Appl. No. 12/145,363, Apr. 1, 2011.
Response to non-final OA mailed Jun. 30, 2011 for U.S. Appl. No. 12/145,363, Jun. 30, 2011.
USPTO Office Action for U.S. Appl. No. 12/145,363, Oct. 4, 2011.
USPTO Office Action for U.S. Appl. No. 12/496,444, Sep. 20, 2010.
USPTO Office Action for U.S. Appl. No. 12/496,444, Mar. 10, 2011.
USPTO Response to Office Action for U.S. Appl. No. 12/496,444 mailed Mar. 10, 2011, May 10, 2011.
USPTO Advisory Action for U.S. Appl. No. 12/496,444, May 25, 2011.
USPTO Pre Appeal Brief for U.S. Appl. No. 12/496,444, Jun. 10, 2011.
USPTO Decision for U.S. Appl. No. 12/496,444, Aug. 17, 2011.
USPTO Appeal Brief for U.S. Appl. No. 12/496,444, Sep. 19, 2011.
USPTO Examiner's Answer for U.S. Appl. No. 12/496,444, Nov. 14, 2011.
USPTO Office Action for U.S. Appl. No. 12/176,935, Mar. 2, 2011.
USPTO Final Office Action for U.S. Appl. No. 12/176,935, Sep. 8, 2011.
R. Housley, Vigil Security: "Using Advanced Encryption Standard (AES) CCM Mode with IPsec Encapsulating Security Payload (ESP)"; rfc 4309.txt, IETF Standard, Internet Engineering Task Force, IETF, CH, Dec. 1, 2005.
Gabber et al., How to make personalized web browsing simple, secure, and anonymous, Financial Cryptography Lecture Notes in Computer Sciences, 1997, vol. 1318/1997, 17-31, 1997.

* cited by examiner

MULTI-LEVEL SECURE INFORMATION RETRIEVAL SYSTEM

TECHNICAL FIELD OF THE DISCLOSURE

This disclosure generally relates to information retrieval systems, and more particularly, to a multi-level secure information retrieval system that accesses information from a federated group of data repositories while maintaining multi-level security.

BACKGROUND OF THE DISCLOSURE

Information provided by distributed computing systems may incorporate various levels of security for protection of the information from illicit use or access. Multi-level security is an aspect of computing system design in which differing processes process information at differing security levels. Computing systems incorporating multi-level security may use mandatory access control (MAC) that limits operations to only those having sufficient privileges or discretionary access control (DAC) in which operations may be controlled based upon their classification.

SUMMARY OF THE DISCLOSURE

According to one embodiment, a multi-level secure information retrieval system includes an enterprise access service tool coupled to one or more client applications and at least one gateway managed by an enterprise. The enterprise access service tool executes services operating in a service oriented architecture. The enterprise access service tool receives requests from the client applications, associates each of the requests with one of a plurality of differing security levels, and transmits the requests to the gateway. The gateway transmits the requested information back to the client applications in which the information is filtered by the gateway according to their associated security levels.

Some embodiments of the disclosure may provide numerous technical advantages. For example, one embodiment of the multi-level secure information retrieval system uses services orchestrated together in a service oriented architecture that may be well suited for accessing information from differing data repositories in an efficient manner. Data repositories of multiple enterprises may manage information differently from one another. According to one embodiment, the service oriented architecture of the enterprise access service tool may incorporate services that provide a common interface for accessing information that is product-agnostic and is extensible for adaptation with future types of data structures that may be used. The services also provide access to data in a federated environment in a manner that conceals the identity of the source of the request for information from participating enterprises.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Enterprise management of information may be accomplished by a multi-level security system (MLS). The multi-level security system usually incorporates a multi-tiered security scheme in which users have access to information managed by the enterprise based upon one or more authorization levels associated with each user. For example, enterprises, such as the government, utilize a multi-level security scheme that may include secret, top secret (TS), and various types of top secret/sensitive compartmented information (TS/SCI) security levels. Implementation of multi-level security systems within the confines of a single enterprise have been accomplished with varying degrees of success. However, some enterprises may often need to share its information with other enterprises. In such cases, implementation of multi-level security systems among a federated network of enterprises has been relatively difficult to achieve.

One reason why multi-level security systems have not worked well with federated networks may be due to information systems that are networked in a "stove pipe" fashion in which each enterprise administers a multi-level security scheme according to its own software coding rules and security practices. Federation of its own information with that of others may, therefore, require constant management to coordinate multi-level security systems that function across enterprise boundaries. Moreover, these federated information systems may cause security leaks to otherwise secure information if their coordination is not managed properly.

Figure 1:
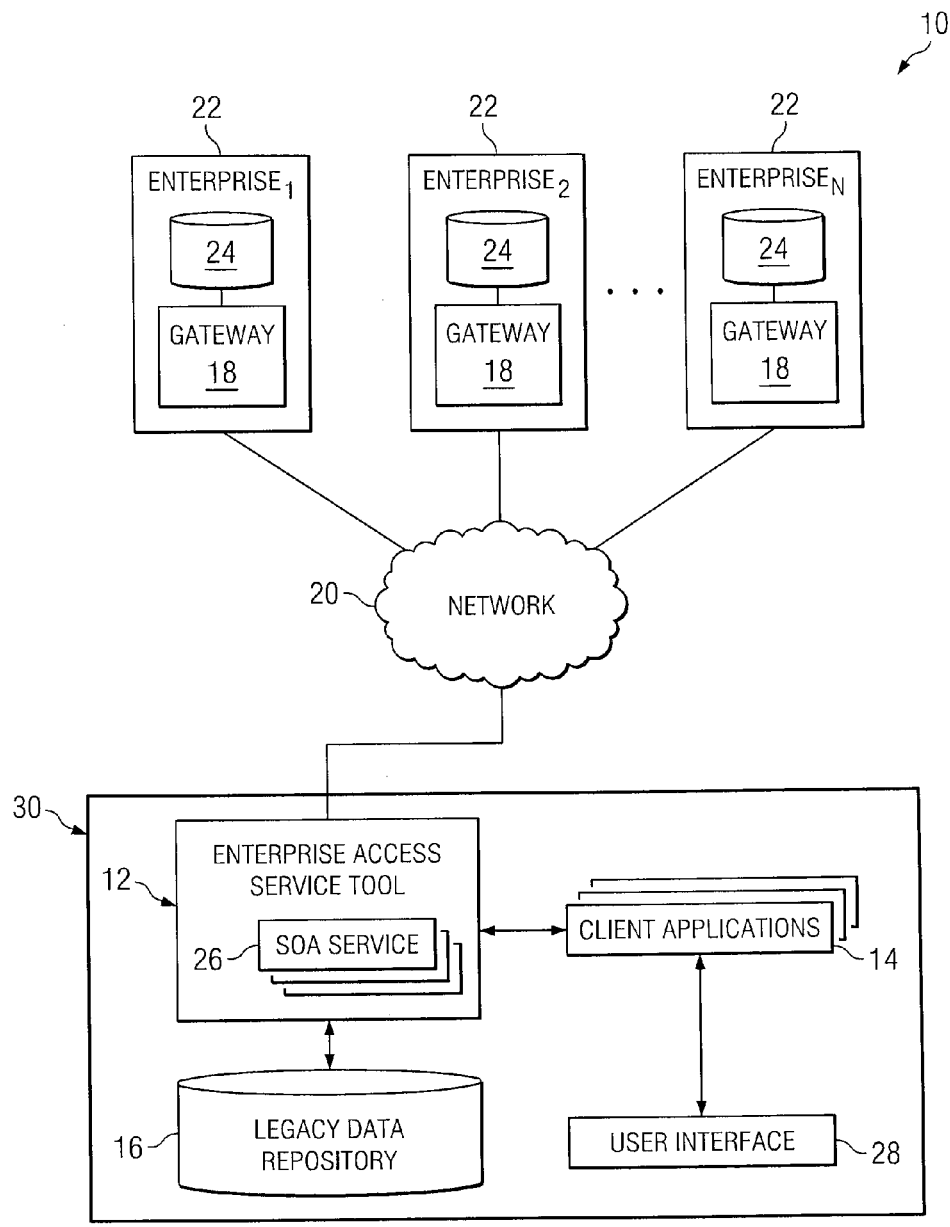
FIG. 1 is a diagram showing one embodiment of a multi-level secure information retrieval system according to the teachings of the present disclosure.

FIG. 1 shows one embodiment of a multi-level secure information retrieval system 10 that may provide a solution to this problem and other problems. Multi-level secure information retrieval system 10 includes an enterprise access service tool 12 coupled to one or more client applications 14, a legacy data repository 16, and a plurality of gateways 18 through a network 20. Each gateway 18 is managed by an associated enterprise 22 that maintains its information in one or more data repositories 24. As will be described in detail below, enterprise access service tool 12 comprises multiple services 26 operating in a service oriented architecture (SOA) that provides a common interface for each gateway 18 for access to information stored in data repositories 24 according to a common multi-level security scheme.

Certain embodiments of enterprise access service tool 12 implementing a service oriented architecture may provide enhanced management of a multi-level security system across enterprise boundaries. Services 26 provide a common interface to gateways 18 that may serve to reduce the effective variations in which information is managed by each participating enterprise 22. In some embodiments, services 26 may also be delegated to have certain functions according to one or more security levels. That is, certain services 26 may be delegated to handle information of one security level while other services 26 handle information of other security levels. In this manner, protection from security leaks may be enhanced by functionally separating the operation of individual functions provided by services 26 from one another.

Enterprise access service tool 12 may also manage access to information stored in legacy data repository 16 according to a multi-level security scheme. Legacy data repository 16 may be any data storage medium that has been traditionally maintained by the particular enterprise 22 executing enterprise access service tool 12. The service oriented architecture of enterprise access service tool 12 provides a platform for seamless access of information from legacy sources, such as legacy data repository 16 and from data repositories 24 of other enterprises 22.

Services 26 each include an executable segment of code that provides a specified function. The function provided by each service 26 has a level of granularity sufficient for management of a multi-level security system across multiple enterprises 22. In one embodiment, services 26 are administered through an enterprise service bus (ESB). The enterprise service bus orchestrates multiple services 26 together to provide one or more business applications, which in this particular application, is a multi-level security system for a federated multi-level secure information retrieval system 10.

Services 26 expose an interface for access by client applications 14. In one embodiment, the interface to client applications 14 may include any suitable authorization scheme, such as a secure sockets layer (SSL) protocol and may include a data-in-transit security protocol, such as a simple object access protocol (SOAP) that transport messages between client applications 14 and services 26 securely using extensible markup language (XML) messaging techniques.

Network 20 may be any suitable network, such as a virtual private network, an intranet, or the Internet. In one embodiment, enterprise access service tool 12 implementing a service oriented architecture may use commercial off-the-shelf (COTS) services 26 that are configured with operate with various types of virtual private networks, such as the joint worldwide intelligence communications system (JWICS), or the secret Internet protocol router network (SIPRNET). These existing services 26 are well-defined and thus, may ensure that current, consistent information is provided to client applications 14 at or above the security level associated with the information.

Client applications 14 may include any suitable type of application that accesses, manipulates, and/or uses information from data repositories 24 of multiple enterprises 22. For example, client application 14 may be an internet-based search engine that searches for certain types of information in data repositories 24 using key-word searching techniques. Other types of client applications 14 may include controlled information publishing applications, enterprise search portals, access control service applications, knowledge discovery applications, or knowledge management applications. Client applications 14 may executed in any suitable environment, such as, for example, a web browser that accesses information from data repositories 24 using a client/server model. In one embodiment, a particular client application 14 may be a search portal conforming to the Java portlet specification (JSR-168) that provides options to search data repository 24 of each enterprise 22 and present the retrieved information independently or in aggregated or merged form.

User interface 28 may include a keyboard, a mouse, a console button, or other similar type of user input device for inputting user information to multi-level secure information retrieval system 10. User interface 28 may also include a display, such as a cathode ray tube (CRT) or a liquid crystal display (LCD) for displaying information accessed by multi-level secure information retrieval system 10.

Enterprise access service tool 12 and client applications 14 may be implemented on any suitable computing system 30 that may be, for example, a network coupled computing system or a stand-alone computing system. The stand-alone computing system may be any suitable computing system, such as a personal computer, laptop computer, or mainframe computer capable of executing instructions necessary to implement services 26 and client applications 14 according to the teachings of the present disclosure. The network computing system may be a number of computers coupled together via a network, such as a local area network (LAN), a metropolitan area network (MAN), or a wide area network (WAN).

Figure 2:
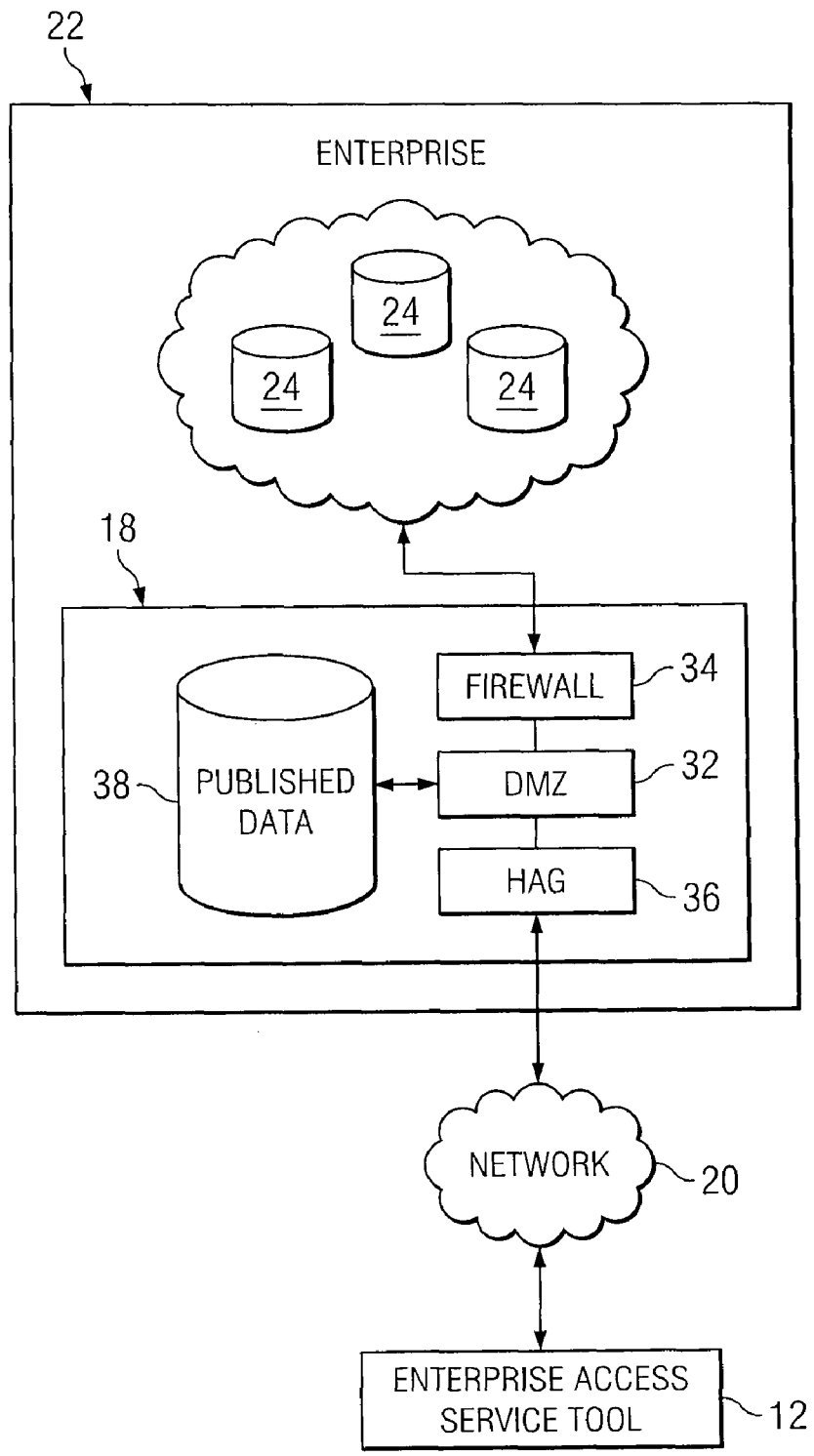
FIG. 2 is a diagram showing several elements of a gateway that may be used with the multi-level secure information retrieval system of FIG. 1.

FIG. 2 shows several elements of a gateway 18 that may be used in conjunction with enterprise access service tool 12 of FIG. 1. Gateway 18 provides a standardized interface for accessing information in data repositories 24 by client applications 14. Gateway 18 includes a demilitarized zone (DMZ) 32 coupled to a firewall 34 and a high assurance guard (HAG) 36 as shown. Enterprise 22 may also have a proxy repository 38 for access by other enterprises 22 for data that is published according to a subscribe/publish data access model. Because each gateway 18 is managed by its respective enterprise 22, internal management of its respective information may be handled independently while providing a standardized interface for controlled access by client applications 14 in a multi-level security environment. In one embodiment, gateway 18 communicates with services 26 using an authorization scheme, such as a secure sockets layer (SSL) protocol and may include a data-in-transit security protocol, such as a simple object access protocol (SOAP) that encapsulates extensible markup language (XML) messages. Gateway 18 of each enterprise 22 may be implemented on any suitable computing system, such as those previously described with reference to services 26 and client applications 14.

High assurance guard 36 restricts access to information stored in data repositories 24 according to a security level associated with a request for that information. High assurance guard 36 validates requests for information from the generally insecure network 20 using one or more security levels associated with each request. In one embodiment, the security level associated with each request for information may include a tag, a metadata instance or other similar coded piece of information appended to its respective request. In another embodiment, the security level may be associated with a particular type of service 26 requesting information from its respective gateway 18. In one embodiment, high assurance guard 36 is a protection level 4 guard as specified by the director of central intelligence directive (DCID) 6/3 specification. A protection level 4 guard according to the director of central intelligence directive 6/3 specifies that information transmissions of different security levels shall be segregated from one another and comply with certain auditing and logging requirements.

In one embodiment, demilitarized zone 32 is implemented with a service oriented architecture that provides various access services to information stored in proxy storage device 38 and/or data repositories 24 of its respective enterprise 22. Services provided by demilitarized zone 32 may include a query proxy that proxies requests for information originating from a particular client application 14 to information stored in one or more data repositories 24. Services may also include a web proxy that provides information using a hypertext transfer protocol over secure socket layer (HTTPS) protocol or other suitable web-based communication protocol. Services may also include a controlled publishing mechanism for disseminating information to certain types of client applications 14 using a publish/subscribe model.

Data repositories 24 may include any type of storage device, such as a magnetic hard disk or tape drive that stores information in computer-readable form. Information stored in data repositories 24 may be stored in a database, a file system, or other suitable format for the organization of information that is accessible by client applications 14. In one embodiment, information stored in data repositories 24 is organized according to a network centric enterprise services (NCES) program as specified by the United States Department of Defense (DoD).

Modifications, additions, or omissions may be made to multi-level secure information retrieval system 10 without departing from the scope of the disclosure. The components of multi-level secure information retrieval system 10 may be integrated or separated. For example, a particular gateway 18 may be executed on a differing computing system or on the same computing system that enterprise access service tool 12 is executed. That is, gateway 18 may each be executed on computing system 30 if the particular enterprise 22 manages gateway 18 and enterprise access service tool 12. Additionally, operations of enterprise access service tool 12 may be performed using any suitable logic comprising software, hardware, and/or other logic.

Figure 3:
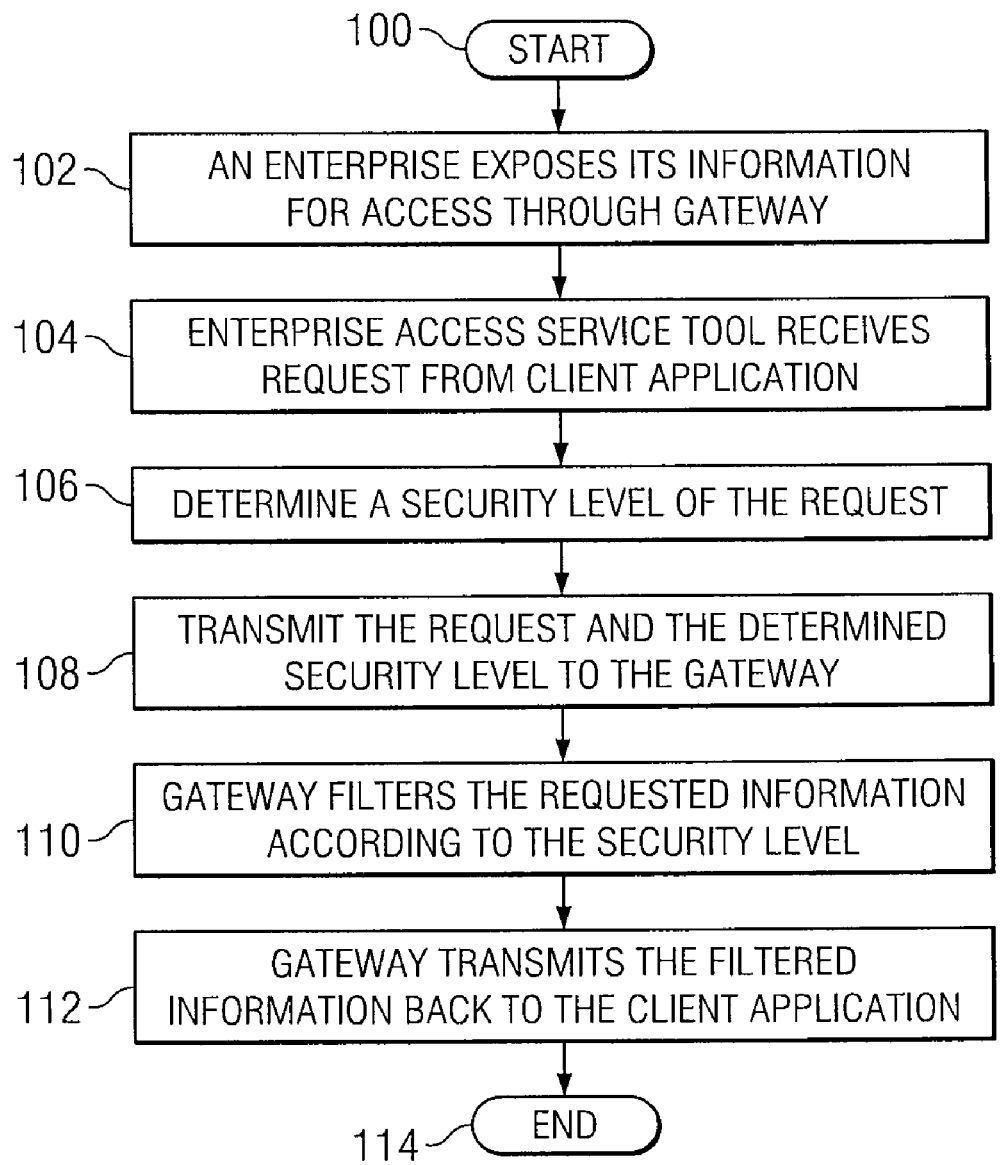
FIG. 3 is a flowchart showing one embodiment of a series of actions that may be performed to access information from a data repository managed a participating enterprise of the multi-level secure information retrieval system of FIG. 1.

FIG. 3 shows one embodiment of a series of actions that may be performed by multi-level secure information retrieval system 10 according to the teachings of the present disclosure. In act 100, the process is initiated.

In act 102, one or more enterprises 22 may expose their information for access through gateway 18. Each enterprise 22 may organize and manage its own information according to specific needs, however, gateway 18 provides an interface for disseminating information to others in a standardized manner via the use of enterprise access service tool 12. Thus, gateway 18 may include various interfacing elements that provide a protocol sufficient for communication with services 26 while being managed by its respective enterprise 22.

In act 104, a client application 14 issues a request for information from the one or more enterprises 22. The interface to client applications 14 that is provided by services 26 validates the specific security level of the client application 14. In some embodiments, direct access to services by users of client applications 14 may be hidden to prevent spoof requests by users of the multi-level secure information retrieval system 10.

In act 106, a particular security level is determined for the request. Functionality provided by each service 26 may be dedicated to one or a few security levels. In this manner, multiple levels of security may be maintained for multiple users who may each be operating at differing security levels. In another embodiment, a tag indicating the security level of the client application 14 issuing the request may be associated with the request.

In act 108, the request is transmitted to gateways 18 managed by each enterprise 22. In many cases, the request is transmitted over a publicly accessible network, such as the Internet. Thus, the request may be encapsulated in a secure transmission mechanism, such as a virtual private network, or an authorization scheme that verifies the credentials of the request.

In act 110, gateway 18 filters the request according to the established security level associated with the request. In one embodiment, gateway 18 includes a high assurance guard 32 that filters incoming requests according to one or more criteria associated with the established security level. In another embodiment, gateway 18 may also include a firewall 34 that prevents improper access to information stored in the enterprise's data repositories 24. Once filtered, the requested information is transmitted to the client application 14 in act 112.

The previously described process continues throughout operation of multi-level secure information retrieval system 10. Additional requests for information may be provided by repeating acts 102 through 110. When use of the multi-level secure information retrieval system 10 is no longer needed or desired, the process ends in act 114.

Modifications, additions, or omissions may be made to the method without departing from the scope of the disclosure. The method may include more, fewer, or other acts. For example, services 26 may request information from other sources in addition to those accessible only through gateways 18. That is, services 26 may issue general requests for information from sources, such as those publicly available through the Internet and/or internal sources that may not be directly regulated by a gateway 18.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A multi-level secure information retrieval system comprising:
    an enterprise access service tool configured for communications with a client application and an enterprise gateway provided by a corresponding enterprise, the enterprise access service tool implemented on a computing system communicatively coupled to the client application and the enterprise gateway, and the enterprise access service tool operable to:
    host a network interface providing access for the client application;
    receive, from the client application via the network interface, an information request for information stored in a data repository managed by the enterprise;
    determine one security level for the information request from a plurality of differing security levels;
    associate the information request with the one security level; and
    transmit the information request to the enterprise gateway;
    wherein the enterprise gateway is operable to transmit a filtered version of the requested information to the client application independent of the enterprise access service tool, the requested information being filtered by the enterprise gateway according to the one security level associated with the information request.

2. The multi-level secure information retrieval system of claim 1, wherein the plurality of differing security levels includes a plurality of security levels that each has an ascending level of security, the enterprise access service tool operable to associate the information request with the one security level and other of the plurality of differing security levels below the one security level.

3. The multi-level secure information retrieval system of claim 1, wherein the information request conforms to a publish/subscribe model.

4. The multi-level secure information retrieval system of claim 1, wherein the client application comprises a web browser.

5. The multi-level secure information retrieval system of claim 1, wherein the computing system is coupled to the enterprise gateway through a publicly accessible network.

6. The multi-level secure information retrieval system of claim 1, wherein the enterprise gateway comprises a high assurance guard.

7. The multi-level secure information retrieval system of claim 1, wherein the enterprise gateway comprises a proxy data repository that is operable to store published data.

8. The multi-level secure information retrieval system of claim 1, wherein the enterprise access service tool is operable to receive, from the client application, another information request for information stored in a legacy data repository, associate the another information request with another one of the plurality of differing security levels, and transmit the requested information stored in the legacy data repository to the client application, the requested information from the legacy data repository filtered by the enterprise access service tool according to the one security level.

9. The multi-level secure information retrieval system of claim 1, wherein the enterprise access service tool provides a plurality of services comprising a plurality of commercial off-the-shelf services that are operable to access the requested information from the data repository through a virtual private network.

10. A secure information retrieval method performed in a multilevel secure environment comprising:
provliding a network interface for access by a client application;
receiving, from the client application, an information request for information stored in a data repository managed by at least one enterprise;
determining one security level for the information request from a plurality of differing security levels;
associating the information request with the one security level; and
transmitting the information request and the one security level to an enterprise gateway of at least one enterprise;
wherein the enterprise gateway is operable to filter the requested information according to the one security level associated with the information request and to transmit the requested information directly from the enterprise gateway to the client application, wherein the requested information is filtered by the enterprise gateway according to the one security level.

11. The method of claim 10, wherein associating the information request with the one security level comprises associating the information request with the one security level and other of the plurality of security levels below the one security level.

12. The method of claim 10, wherein receiving the information request for information comprises receiving the information request conforming to a publish/subscribe model.

13. The method of claim 10, wherein receiving the information request for information from the client application comprises receiving the information request from a web browser.

14. The method of claim 10, wherein the requested information is filtered by the enterprise gateway comprising a high assurance guard.

15. The method of claim 10, further comprising:
receiving, from the client application, another information request for information stored in a legacy data repository;
associating the another information request with another one of the plurality of differing security levels; and
transmitting the requested information stored in the legacy data repository to the client application, the requested information from the legacy data repository filtered by the enterprise access service tool according to the one security level.

16. The method of claim 10, wherein receiving the information request occurs in connection with a plurality of services operating in a service oriented architecture and comprises receiving the information request by a plurality of commercial off-the-shelf services and accessing the requested information from the at least one data repository through a virtual private network.

17. A non-transitory computer-readable medium having code stored therein that, when executed by a processor, is operable to perform at least the following:
host, by a service, a network interface for information access by a client application;
receive, at the service from the client application via the network interface, an information request for information stored in a data repository managed by at least one enterprise;
determine, by the service, one security level for the information request from a plurality of differing security levels;
associate the information request with the one security level; and
transmit the information request and the one security level to an enterprise gateway of at least one enterprise;
wherein the enterprise gateway is operable to transmit a filtered version of the requested information to the client application independent of the service, the requested information being filtered by the enterprise gateway according to the one security level associated with the information request.

18. The non-transitory computer-readable medium of claim 17, wherein associating the information request with the one security level comprises associating the information request with the one security level and other of the plurality of security levels below the one security level.

19. The non-transitory computer-readable medium of claim 17, wherein the information request conforms to a publish/subscribe model.

20. The non-transitory computer-readable medium of claim 17, wherein the information request is a request from a web browser.

21. The non-transitory computer-readable medium of claim 17, wherein the enterprise gateway comprises a high assurance guard.

22. The non-transitory computer-readable medium of claim 17, wherein the code is further operable to:
receive, from the client application, another information request for information stored in a legacy data repository;
associate the another information request with another one of the plurality of differing security levels; and
transmit the requested information stored in the legacy data repository to the client application, the requested information from the legacy data repository filtered by the enterprise access service tool according to the one security level.

23. The non-transitory computer-readable medium of claim 17, wherein the plurality of services comprises by a plurality of commercial off-the-shelf services and wherein the code is further operable to access the requested information from the at least one data repository through a virtual private network.

* * * * *

UNITED STATES PATENT AND TRADEMARK OFFICE
CERTIFICATE OF CORRECTION

| | |
|---|---|
| PATENT NO. | : 8,359,641 B2 |
| APPLICATION NO. | : 12/329407 |
| DATED | : January 22, 2013 |
| INVENTOR(S) | : DelRocco et al. |

It is certified that error appears in the above-identified patent and that said Letters Patent is hereby corrected as shown below:

In the Specification

In column 5, line 61, delete "32" and insert --36--, therefor

In the Claims

In column 6, line 64, Claim 5, delete "the" and insert --that--, therefor

Signed and Sealed this
Eighteenth Day of June, 2013

Teresa Stanek Rea
*Acting Director of the United States Patent and Trademark Office*